US008886506B2

(12) United States Patent
Conway

(10) Patent No.: US 8,886,506 B2
(45) Date of Patent: Nov. 11, 2014

(54) PATH FAILURE IMPORTANCE SAMPLING

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 764 days.

(21) Appl. No.: 13/076,546

(22) Filed: Mar. 31, 2011

(65) Prior Publication Data
US 2012/0253772 A1 Oct. 4, 2012

(51) Int. Cl.
*G06F 17/50* (2006.01)
*G06F 15/173* (2006.01)
*H04L 12/24* (2006.01)
*H04L 29/14* (2006.01)
*H04L 12/703* (2013.01)

(52) U.S. Cl.
CPC .............. *H04L 41/145* (2013.01); *H04L 45/28* (2013.01); *H04L 41/5016* (2013.01); *H04L 69/40* (2013.01)
USPC .............................. 703/13; 709/223; 709/224

(58) Field of Classification Search
CPC ....... H04L 41/62; H04L 41/145; H04L 69/40; H04L 45/28; H04L 41/0213; H04L 29/08072; H04L 29/06; H04L 43/00; H04L 45/00; H04L 45/02; H04L 26/0854
USPC ........... 703/6, 13, 14; 709/223, 224; 370/242, 370/248, 250
See application file for complete search history.

(56) References Cited

U.S. PATENT DOCUMENTS

| 7,426,554 | B2 * | 9/2008 | Kennedy | ........................ 709/223 |
| 2002/0129157 | A1 * | 9/2002 | Varsano | ........................ 709/232 |
| 2004/0052527 | A1 * | 3/2004 | Kirby | .............................. 398/57 |
| 2004/0202468 | A1 * | 10/2004 | Harney | ........................... 398/16 |
| 2010/0232299 | A1 | 9/2010 | Conway | |

OTHER PUBLICATIONS

Conway, Adrian E., "Fast Simulation of Service Availability in Mesh Networks with Dynamic Path Restoration," ACM Transaction on Networking, Feb. 2011, vol. 19, No. 1, IEEE Networking.

* cited by examiner

*Primary Examiner* — Dwin M Craig
*Assistant Examiner* — Andre Pierre Louis

(57) ABSTRACT

A method including receiving a network model including paths having dynamic path restoration capabilities; receiving network simulation information including a failure rate that indicates a rate of failure, a repair rate that indicates a rate of repair, a number of repair personnel assigned to each failure equivalence group, and a regeneration value indicating a number of regenerations to occur for each designated path during a network simulation, biasing the failure rate; determining whether one of the designated paths enters a failure state; unbiasing the failure rate when it is determined that the designated path enters the failure state; identifying when the network model returns to an operative state; ceasing an execution of the network simulation when it is determined no other designated paths are to be simulated; calculating an average time of path unavailability for each designated path simulated; and calculating path unavailability for each designated path simulated.

24 Claims, 9 Drawing Sheets

PATH FAILURE IMPORTANCE SAMPLING

BACKGROUND

As network operators and service providers strive to provide new or improved services and/or assets to users, network requirements may correspondingly increase. As a result, network operators and service providers must confront a host of challenges to ensure that quality of service (QOS) and other performance metrics are maintained. For example, one important challenge confronted by network operators and service providers is to ensure that service is not degraded or minimally degraded due to failures in the network.

Protection path(s) can be used to maintain end-to-end services when a network failure event occurs. The protection path(s) for a service can be pre-provisioned statically or generated dynamically in response to a network failure event.

DETAILED DESCRIPTION OF PREFERRED EMBODIMENTS

Figure 1:
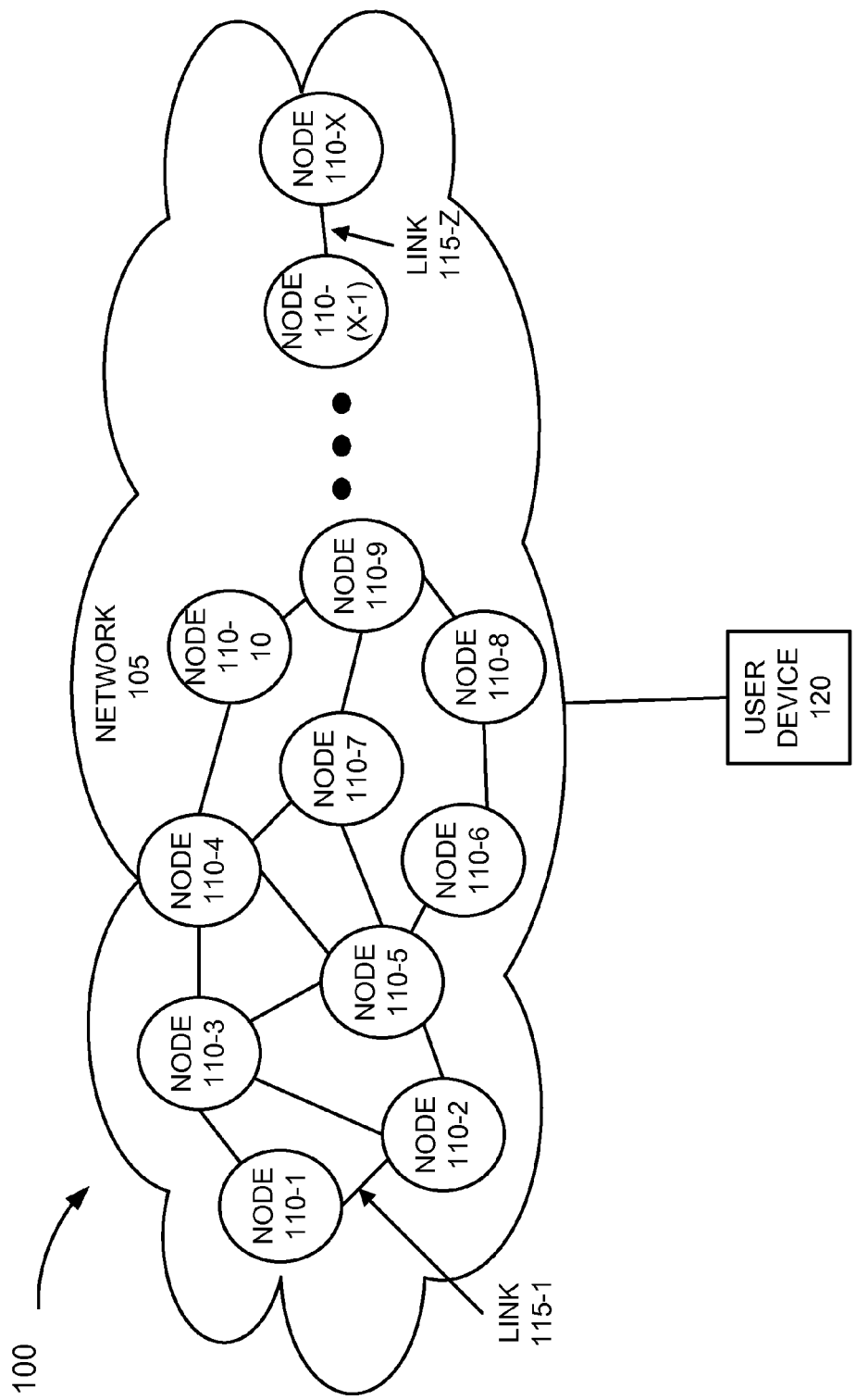
FIG. 1 is a diagram illustrating an exemplary environment in which in which exemplary embodiments may be implemented.

The following detailed description refers to the accompanying drawings. The same reference numbers in different drawings may identify the same or similar elements. Also, the following detailed description does not limit the invention.

The term "network," as used herein, is intended to be broadly interpreted to include a wireless network and/or a wired network. The network may have, for example, a mesh topology, a star topology, a fully-connected topology, or some other type of topology. The term "node," as used herein, is intended to be broadly interpreted to include a network device having routing or switching capability. For example, the node may correspond to a router, a switch, a bridge, a gateway, a computer, a server, etc.

The term "path," as used herein, is intended to be broadly interpreted to include a physical path and/or a logical path. For example, a path may correspond to an Internet Protocol (IP) path, a Multi-Protocol Label Switching (MPLS) path, a light (i.e., optical) path, a virtual circuit path, or any combination thereof. The path may correspond to an end-to-end path (e.g., from a source to a termination).

A simulation technique called Dynamic Path Failure Importance Sampling (DPFS) was developed for the Markov Monte Carlo simulation of path availability in mesh networks having dynamic path restoration. DPFS is described in detail in A. E. Conway, "Fast Simulation of Service Availability in Mesh Networks with Dynamic Path Restoration," IEEE/ACM Transactions on Networking, Jul. 12, 2010, and in U.S. Patent Application Publication No. 20100232299, which are incorporated in their entirety herein. In DPFS, the failure rates of network elements are biased at increased rates until path failures are observed under an assumed dynamic path rerouting algorithm.

The exemplary embodiments described herein pertain to modifications of the DPFS algorithm. A first modification of the DPFS algorithm is called Stratified-DPFS. In a network, the unavailability of one or multiple end-to-end paths may be higher relative to other end-to-end path(s). In fact, there may be orders of magnitude differences between end-to-end paths. As a result, some path failures may not be sampled during a simulation with DPFS, at least not without an excessive number of simulation regenerations. According to an exemplary embodiment, in Stratified-DPFS, the transition rates (e.g., failures rates and/or repair rates) may be biased at increased rates or decreased rates until a particular chosen path failure is observed under rerouting.

A second modification to the DPFS algorithm is called Adaptive Stratified-DPFS. In Stratified-DPFS, the number of simulation regenerations used in the biasing for each path is made equal. In Adaptive Stratified-DPFS, the number of simulation regenerations used in the biasing for a path is adapted based on an observed sample coefficient of variation of the path unavailability. In this way, the sampling of all path failures is more likely to occur during a simulation. For example, a path that has an intrinsically higher unavailability sample variance may be subjected to more simulation regenerations than a path that has an intrinsically lower unavailability sample variance.

Other variations of the DPFS algorithm may be designed specifically for networks that use groups of static, pre-provisioned protection paths for end-to-end service protection. A first modification of DPFS is called Path Group Failure Importance Sampling (PGFS). In PGFS, the transition rates of links are biased at increased rates or decreased rates until a path group failure is observed. A second modification and a third modification are called Stratified-PGFS and Adaptive Stratified-PGFS. In Stratified-PGFS, the transition rates may be biased at an increased rate or a decreased rate until a particular path group failure is observed under rerouting. In Adaptive Stratified-DPFS, the number of simulation regenerations used in the biasing for each path group is adapted based on an observed sample coefficient of variation of the path group availability.

FIG. 1 is a diagram illustrating an exemplary environment 100 in which exemplary embodiments may be implemented. As illustrated in FIG. 1, exemplary environment 100 may include a mesh network 105 that includes nodes 110-1 through 110-X (referred to as nodes 110 or individually as node 110), links 115-1 through 110-Z (referred to as links 115 or individually as link 115), and user device 120.

The number of devices and configuration in environment 100 is exemplary and provided for simplicity. According to other embodiments, environment 100 may include additional devices, fewer devices, different devices, and/or differently arranged devices than those illustrated in FIG. 1. Environment 100 may include wired and/or wireless connections among the devices illustrated.

Mesh network 105 may include one or multiple networks of one or multiple types. Nodes 110 may include a network device having routing or switching capability. Links 115 may include connections or communication paths between nodes 110.

User device 120 may include a computational device. For example, user device 120 may correspond to a computer or a server, which may reside inside or outside of mesh network 105. User device 120 may include an application (e.g., a Stratified-DPFS application, an Adaptive Stratified-DPFS application, a PGFS application, a Stratified-PGFS application, and/or an Adaptive Stratified-PGFS application) to provide network simulation(s) according to the exemplary embodiments of the algorithms described. By way of example, the application may be implemented as a text-based simulation environment (e.g., Visual Basic, ns-2, ns-3, MAT-LAB, Octave, Python, Comsol Script, MATRIX, Mathcad, Maple, C++, C, JAVA, etc.) a graphically-based simulation environment (e.g., Simulink, Simflow, VisSim, LabView), or a hybrid simulation environment that includes text-based and graphical-based environments.

With reference to FIG. 1, according to an exemplary process, user device 120 may receive network topology information pertaining to mesh network 105 and initialization information for executing one of the Stratified-DPFS application, the Adaptive Stratified-DPFS application, the PGFS application, the Stratified-PGFS application, or the Adaptive Stratified-PGFS application. Depending on the application executed, user device 120 may simulate mesh network 105, and calculate, among other things, mean estimates of average times for path or path group unavailabilities and estimates of unavailability of paths or path groups, as described further below. The estimates may be output (e.g., as a file, displayed, etc.) to a user. The user may use this information for assessing service availability, etc., as such factors pertain to mesh network 105.

According to exemplary embodiments, mesh network 105 may be formulated in terms of nodes, links, circuits, and paths. A unidirectional circuit traverses one or more unidirectional links. A unidirectional path traverses one or more unidirectional circuits. Mesh network 105 may include L unidirectional point-to-point links. The bandwidth of a link x is denoted by $B_{link}(x)$ bits/second. A link can be in an operational state or a failed state. A failed link has no available bandwidth. The instantaneous available bandwidth of a link x at a time t is denoted by $B_{link}(x,t)$ with initial condition $B_{link}(x,0)=B_{link}(x)$. A bidirectional link can be modeled using a pair of unidirectional links.

A circuit is defined to be a unidirectional connection between two nodes 110 over a set of interconnected links 115. The total number of circuits in mesh network 105 is denoted by C. The total bandwidth in a circuit i is denoted by $B_{circuit}(i)$ bits/second. The circuit i consumes the bandwidth $B_{circuit}(i)$ in each link of circuit i. The circuit routing matrix is defined to be $C=[c_{ix}: 1\leq i\leq C, 1\leq x\leq L]$, in which $c_{ix}=1$ if circuit i uses link x, and 0 otherwise. The circuit routing matrix C is static in time. A link may be used by more than one circuit. The bandwidth of a circuit is less than or equal to the bandwidth of any of the links that the circuit uses, i.e., $B_{circuit}(i)\leq Min\{B_{link}(x)|c_{ix}=1, 1\leq x\leq L\}$. The sum of the bandwidths of the circuits that use link x is less than or equal to the link bandwidth $B_{link}(x)$. If a circuit uses a link that is in a failed state, then the circuit is considered to be in a failed state with no available bandwidth. An instantaneous available bandwidth of circuit i at time t is denoted by $B_{circuit}(i,t)$, in which $B_{circuit}(i,t)\leq Min\{B_{link}(x,t)|c_{ix}=1, 1\leq x\leq L\}$, with initial condition $B_{circuit}(i,0)=B_{circuit}(i)$. A bidirectional circuit is modeled using a pair of unidirectional circuits. The two directions of a bidirectional circuit can have different routes over the links of the network A path is defined to be a unidirectional end-to-end connection between two nodes 110 over a set of interconnected circuits. The total number of paths is denoted by P. The required bandwidth of a path i is denoted by $B_{path}(i)$ bits/second. A path consumes the bandwidth $B_{path}(i)$ in each of the circuits that it uses. A circuit may be used by more than one path.

In the case of dynamic path restoration, the routing of a particular path in terms of working circuits may change in time as circuit failures occur due to link failures and paths are rerouted. The state of the path routing at a time t is given by a time-varying path routing matrix $P(t)=[p_{ic}(t):1\leq i\leq P, 1\leq c\leq C]$, in which $p_{ic}(t)=1$ if a path i uses a circuit c at time t, and 0 otherwise. The routing of all paths is subject to the available bandwidth of each circuit. The initial path matrix P(0) is assumed to be given. If a working route for a path cannot be found, then the path is no longer operational. Let $A(i,t)=1$ if path i is operational at time t, and 0 otherwise, with the initial condition $A(i,0)=1$ for $1\leq i\leq P$.

In the case of groups of static protection paths, the path routing is given by a static path routing matrix $P=[p_{ic}:1\leq i\leq P, 1\leq c\leq C]$, in which $p_{ic}=1$ if a path i uses a circuit c, and 0 otherwise. The paths may be fully disjoint or partially linked-disjoint. In the case of partial disjointedness, different paths may have some circuits in common. The static paths are assigned to S groups. Each path is assigned to one particular group. The number of paths in a group s is denoted by N(s). The path group s is operational if at least one of the paths in group s is operational, otherwise it is not operational. If $N(s)=1$, then paths is an unprotected path.

A failure equivalence group (FEG) is defined to be a particular subset of unidirectional links together with an associated failure and repair process in mesh network 105. A particular link may belong to one or more FEGs. During any instance in time, each FEG is in either an operational state or a failed state. When a FEG is in a failed state, all of the unidirectional links in the FEG are unusable. A unidirectional link is useable, if and only if all other unidirectional links in the FEG, to which the unidirectional link belongs, are operational. Each FEG experiences the arrival of failure events that cause the FEG to be in a failed state. The failure events in a particular FEG are repaired by a finite or an infinite pool of repair personnel that is dedicated to the FEG. When a FEG is operational and a failure event arrives to the FEG, the FEG enters the failed state and the repair of the failure event is started by a repair person. While in the failed state, the FEG may also experience additional independent arrivals of failure events. The additional failure events may be repaired by additional repair persons in parallel or placed in a repair queue. In general, the failure and repair process for each FEG is modeled as a dedicated finite source, multi-server queue or an infinite source, multi-server queue, with the number of servers corresponding to the population of the repair personnel associated with the FEG. Whenever the repair of all outstanding failure events in the FEG has been completed, the FEG re-enters the operational state. The FEG construct enables the modeling of bidirectional link failures/repairs, multiple simultaneous cuts in series along particular unidirectional or bidirectional links, the failure/repair of in-line optical fiber amplifiers, node failures, geographically distributed physical failure events, and preventative maintenance.

The number of FEGs in the network mesh 105 is denoted by G. The failure and repair processes of the FEG are assumed to be independent and Markovian. The failure arrival process of a FEG may correspond to either an infinite source or a finite source. The maximum possible number of failure events in FEG g is $K_g$. In the case of an infinite source, the failure event arrival rate of FEG g is $\lambda_g$ and $K_g=\infty$. In the case of a finite source, the number of sources is $K_g$ and the arrival rate for each source is $\lambda_g$. The repair rate of a group g failure, by a repair person, is $\mu_g$. Let $\mu_g=\lambda_g/\mu_g$.

The state of the FEG at time t is given by the random variable $N(t)=(N_1(t), \ldots, N_G(t))$, in which $N_g(t)$ is the number of FEG g failure events at time t that have not been repaired. If $N_g(t)=0$, then FEG g is in the operational state, otherwise it is in the failed state. The number of repair personnel associated with FEG g is $R_g$. The FEG failure and repair process forms a continuous-time Markov chain with state-space $F=\{n|n=(n_1, \ldots, n_G), 0 \leq n_g \leq K_g, 1 \leq g \leq G\}$ and initial state $N(0)=(0, \ldots, 0)$. Since each FEG is independent and each FEG process corresponds to a Markovian queue, the joint steady-state probability distribution $\pi(n)$ of the FEG process is given by the product-form represented by the following expression:

$$\pi(n) = \Pi_{g=1}^{G} f_g(n_g),$$

in which $f_g(.)$ corresponds to the steady-state distribution of an $M/M/R_g/K_g/K_g$ type of queue.

According to a DPFS simulation, path unavailabilities, rather than path availability is used. The path unavailability $U(i)$, $1 \leq i \leq P$, is the average proportion of time that path i is not operational in steady-state. Let T be the random variable of the recurrence time of the state $n=0$. It follows that the path unavailability $U(i)$ is given by the following expression:

$$U(i) = D(i)(\Sigma_{g=1}^{G} \xi_g \lambda_g) \Pi_{g=1}^{G} f_g(0)$$

in which $D(i)$ is the average time that path i is not operational in a recurrence time T, $\xi_g=1$, if FEG g is an infinite source, and $\xi_g$ if FEG g is a finite source. A method of estimating the average downtime $D(i)$ in a recurrence time T is to apply regenerative simulation to the associated embedded discrete-time Markov chain (DTMC) with state $n=0$ as the regenerative state.

Let $B_{circuit}(k)$ be the state of the circuit bandwidths at time epoch k in the DTMC, and let $P(k)$ be the state of the path routing at time epoch k in the DTMC. The state of the circuits and paths do not change during the holding time in a state. When there is a transition out of a state due to a FEG failure event or a repair, the state of the circuits becomes $B_{circuit}(k+1)$ and the state of the paths become $P(k+1)$, in which $P(k+1)=R(P(k), B_{circuit}(k+1))$ and $R(.)$ is the path rerouting function, which is assumed to be given. Let $U(i, k)=1$ if path i is not operational at time epoch k in the DTMC under $B_{circuit}(k)$ and $P(k)$, and 0 otherwise.

Let $T(z)$ be the set of all possible tours $t(z)$ of length z in the DTMC, starting at state 0 and returning back to state 0 in z steps, in which $t(z)=(0, t_2, \ldots, t_z, 0)$, $t_k$ is the DTMC state at time epoch k, $t_k=(t_{1k}, \ldots, t_{Gk})$, and $t_{gk}$ is the number of FEG g failures at time epoch k that have not been repaired. Let $\Pi(t(z),z)$ be the probability of realizing tour $t(z)$. Then, $D(i)$ can be expressed as:

$$D(i) = \sum_{z=2}^{\infty} \sum_{t(z) \in T(z)} \prod (t(z), z) \sum_{k=1}^{z} U(i, k) h(t_k),$$

in which $\Pi(t(z),z)=p(0, t_2)p(t_2, t_3) \ldots p(t_z, 0)$, and $p(t_a, t_b)$, $t_a, t_b \in F$, is the state transition probability from state $t_a$ to $t_b$ in the DTMC. Hence, if the DTMC is simulated using conventional Markov Monte Carlo simulation starting at state 0 until it returns to state 0, then an estimate of $D(i)$ is given by $\Sigma_{k=1}^{z} U(i,k)h(t_k)$, in which z is the realized number of steps in the tour in the DTMC. With the DTMC simulated using importance sampling, the state transition probabilities $p(t_a, t_b)$, $t_a, t_b \in F$, are modified to the values $p^*(t_a, t_b)$ so that FEG failure events are more likely to arrive. Then, $D(i)$ can be expressed as:

$$D(i) = \sum_{z=2}^{\infty} \sum_{t(z) \in T(z)} \prod {}^*(t(z), z) \Lambda(t(z), z) \sum_{k=1}^{z} U(i, k) h(t_k),$$

in which $\Pi^*(t(z),z)=p^*(0, t_2)p^*(t_2, t_3) \ldots p^*(t_z, 0)$, and $$\Lambda(t(z), z) = \frac{\prod (t(z), z)}{\prod {}^* (t(z), z)} = \frac{p(0, t_2)p(t_2, t_3) \ldots p(t_z, 0)}{p^*(0, t_2)p^*(t_2, t_3) \ldots p^*(t_z, 0)}$$

is the likelihood ratio.

Hence, if a simulation of the DTMC starts at state 0 until it returns to state 0, then an estimate of the average downtime $D(i)$ is given by $\Lambda(t, z) \Sigma_{k=1}^{z} U(i, k)h(t_k)$, in which z is the realized number of steps in the tour in the modified DTMC. The manner in which the DTMC transition probabilities can be modified to $p^*(.)$ is very general. In DPFS, the failure rates $\lambda_g$ are set in the FEG at an increased level until path failures are observed to occur or state $n=0$ is reached in a regenerative cycle. More specifically, in DPFS, the FEG failure bias is defined as a constant $\beta, \beta>1$, such that the failure rate $\lambda_g$ is increased to $\beta\lambda_g$ for $1 \leq g \leq G$. A target failure rate ratio $\alpha, \alpha>0$ is also defined. The target is a desired ratio of the sum of the biased FEG failure rates $\beta\lambda_g$ and the sum of the FEG repair rates $\mu_g$. If the target is $\alpha$, whose value may be set by a user, then the FEG failure bias $\beta$ is expressed by:

$$\beta = \alpha \Sigma_{g=1}^{G} \mu_g / \Sigma_{g=1}^{G} \lambda_g.$$

DPFS provides for a simulation of the DTMC with the biased failure rates $\beta\lambda_g$ starting from state $n=0$ until a path failure is observed or a state $n=0$ is reached. Once a path failure is observed, the bias $\beta$ is set to 1.0 (i.e., turned off). The system then eventually returns to state $n=0$ after all FEG repairs have been made.

According to an exemplary embodiment, the DPFS algorithm for a mesh network with dynamic path restoration may be performed according to the following, in which the total number of independent regenerations is denoted by I, the estimate $D(i)$ obtained in regeneration r is denoted by $D'(i,r)$, and $m=(m_1, \ldots, m_G)$ is a dummy variable.

```
Set the target failure rate ratio α.
Set the bias β.
For r = 1, ..., I
{
    Set the initial state to n = 0.
    Set m ≠ 0.
    Initialize circuits state B_circuit (0) and paths routing P(0).
    For 1 ≤ g ≤ G: Set failure rate λ_g to β λ_g (i.e., turn the bias on).
    For 1 ≤ i ≤ P: Set D'(i,r) = 0 and U(i, 0) = 0.
    Set k = 0 and Λ = 1.0.
    While m ≠ 0
    {
        For 1 ≤ i ≤ P: D'(i,r) = D'(i,r) + U(i, k)h(n).
        If U(i, k) = 1 for any i, 1 ≤ i ≤ P:
            Set failure rate of FEG g to λ_g (i.e., turn the bias off) for
            1 ≤ g ≤ G.
        Randomly sample the next state transition out of state n in the
```

-continued

```
DTMC:
    New state is m.
    Set Λ = Λ p(n, m) / p*(n, m) and k = k+1.
    Update B_{circuit}(k).
    Update path routing P(k) = R(P(k-1), B_{circuit}(k)).
    For 1 ≤ i ≤ P: Update U(i, k).
    Set n = m.
    }
    For 1 ≤ i ≤ P: D'(i,r) = D'(i,r) Λ.
}
```

Following the completion of the DPFS simulation, the mean estimate of D(i), denoted by D'(i), can be expressed according to the following:

$$D'(i) = \Sigma_{r=1}^{I} D'(i,r)/I. \quad (1)$$

Additionally, the estimate of the unavailability of path i, denoted by U'(i), can be expressed according to the following:

$$U'(i) = D'(i)(\Sigma_{g=1}^{G} \xi_g \lambda_g) \Pi_{g=1}^{g} f_g(0). \quad (2)$$

Figure 2:
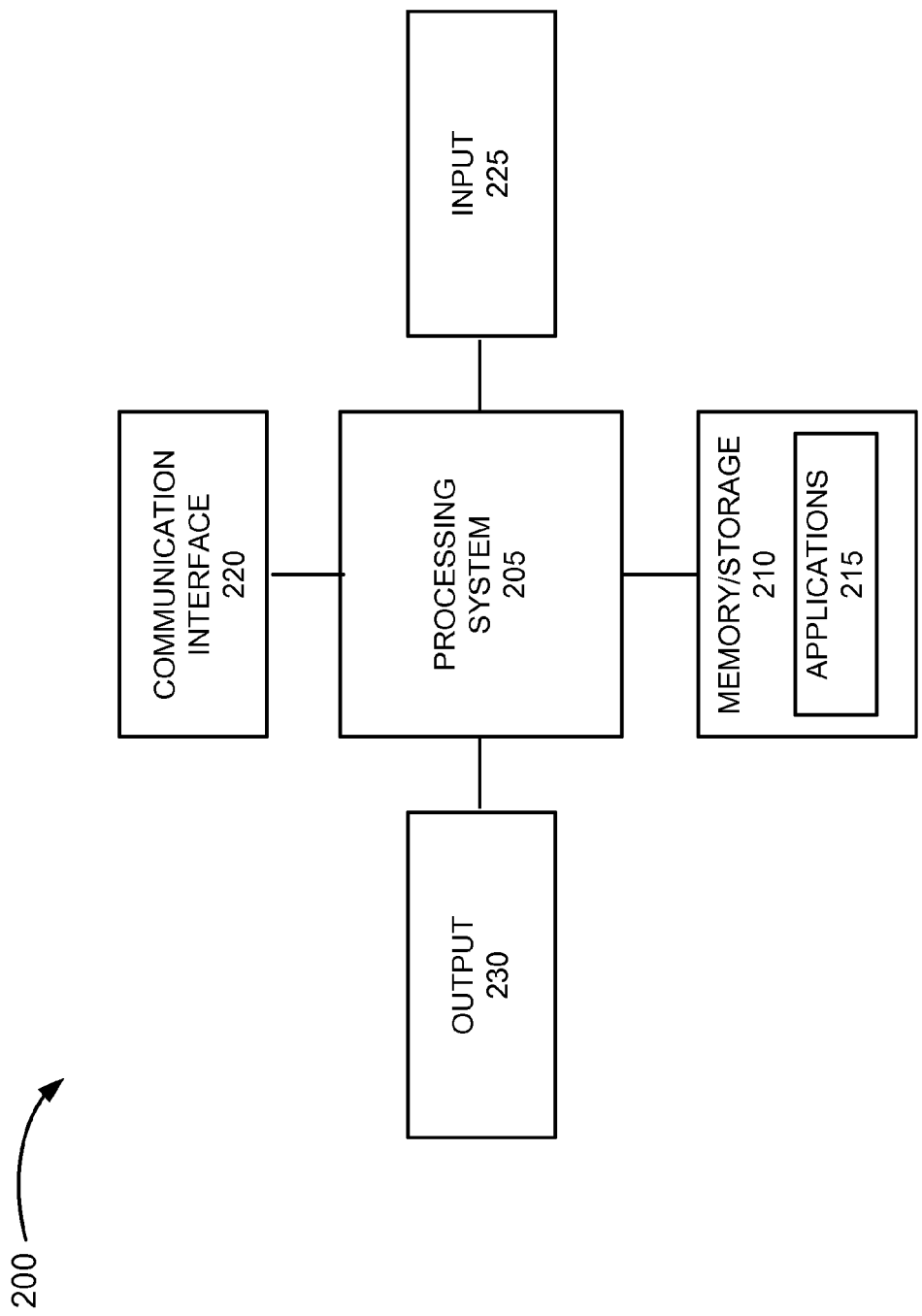
FIG. 2 is a diagram illustrating exemplary components of a device that may correspond to one or more devices in the exemplary environment depicted in FIG. 1.

FIG. 2 is a diagram illustrating exemplary components of a device 200 that may correspond to one or more of the devices in environment 100. For example, device 200 may correspond to node 110 and/or user device 120 depicted in FIG. 1. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, multi-core processors, application specific integrated circuits (ASICs), controllers, programmable logic devices, chipsets, field programmable gate arrays (FPGAs), system on chips (SoCs), microcontrollers, central processing units (CPUs), or some other component that may interpret and/or execute instructions and/or data. Depending on the type of processing system 205, processing system 205 may be implemented as hardware, or a combination of hardware and software, may include a memory (e.g., memory/storage 210), etc.

Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) and a corresponding drive. Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

The term "computer-readable medium," as used herein, is intended to be broadly interpreted to include, for example, a memory, a CD, a DVD, a BD, or another type of tangible storage medium.

Applications 215 may include software that performs various services or functions. For example, with reference to node 110, applications 215 may include one or multiple applications pertaining to routing packets or other forms of network traffic. With reference to user device 120, applications 215 may include applications for simulating a network in accordance with Stratified-DPFS, Adaptive Stratified-DPFS, PGFS, Stratified-PGFS, and/or Adaptive Stratified-PGFS.

Communication interface 220 may permit device 200 to communicate with other devices, networks, systems and/or the like. Communication interface 220 may include one or multiple wireless interface(s) and/or wired interface(s). Communication interface 220 may include one or multiple transmitter(s) and receiver(s), or transceiver(s).

Input 225 may permit an input into device 200. For example, input 225 may include a keyboard, a mouse, a camera, a scanner, a microphone, a display (e.g., a touch-screen), a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

Device 200 may perform operation(s) and/or process(es) in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

A problem that can arise when applying DPFS to a mesh network with dynamic path restoration is that DPFS may not obtain any non-zero estimates D'(i,r) for a path i. In such a case, DPFS is not able to obtain an estimate U'(i) for the unavailability of path i. This situation can arise if the unavailability of paths is imbalanced or have orders of magnitude difference. In practice, one reason for this problem stems from the fact that paths between node pairs that are geographically closer to each other will, naturally and typically, have a lower service unavailability compared to paths between node pairs that are more distant from each other. According to Stratified-DPFS, this potential problem may be minimized by turning the failure biasing off in DPFS only when the failure of each path, as opposed to any path, has been sampled. This makes it much more likely path failure samples for all paths in the network may be obtained.

In Stratified-DPFS, I(p) regenerations are assigned for the sampling of path p failures. The total number of simulated regenerations is I=I(1)+ . . . +I(P). Without loss of generality, I(1) may be set to I(1)=I(2)= . . . =I(P). According to exemplary embodiment, a Stratified-DPFS simulation may include to simulate I(1) regenerations with the failure biasing turned on until the failure of path 1 is sampled or the regenerative state n=0 is reached; simulate I(2) regenerations with the failure biasing turned on until the failure of path 2 is sampled or the regenerative state n=0 is reached; and so on, until all I regenerations have been completed. According to an exemplary embodiment, the Stratified-DPFS algorithm may be performed according to the following pseudo-code:

```
Set the target failure rate ratio α.
Set the bias β.
For 1 ≤ p ≤ P
{
    For x = 1, ..., I(p)
    {
        r = x + Σ_{i=1}^{p-1} I(i)
        Set the initial state to n = 0.
        Set m ≠ 0.
        Initialize circuits state B_{circuit} (0) and paths routing P(0).
        For 1 ≤ g ≤ G: Set failure rate λ_g to β λ_g (i.e., turn the bias on).
        For 1 ≤ i ≤ P: Set D'(i,r) = 0 and U(i, 0) = 0.
        Set k = 0 and Λ = 1.0.
        While m ≠ 0
        {
            For 1 ≤ i ≤ P: D'(i,r) = D'(i,r) + U(i, k)h(n).
            If U(p, k) = 1:
                Set failure rate of FEG g to λ_g (i.e., turn the bias off)
                for 1 ≤ g ≤ G.
            Randomly sample the next state transition out of state n in the DTMC:
                New state is m.
            Set Λ = Λ p(n, m) / p*(n, m) and k = k+1.
            Update B_{circuit} (k).
            Update path routing P(k) = R(P(k-1), B_{circuit} (k)).
            For 1 ≤ i ≤ P: Update U(i, k).
            Set n = m.
        }
        For 1 ≤ i ≤ P: D'(i,r) = D'(i,r) Λ.
    }
}
```

Following the completion of a Stratified-DPFS simulation, the estimates D'(i) and U'(i) can obtained using equations (1) and (2), respectively.

Figure 3:
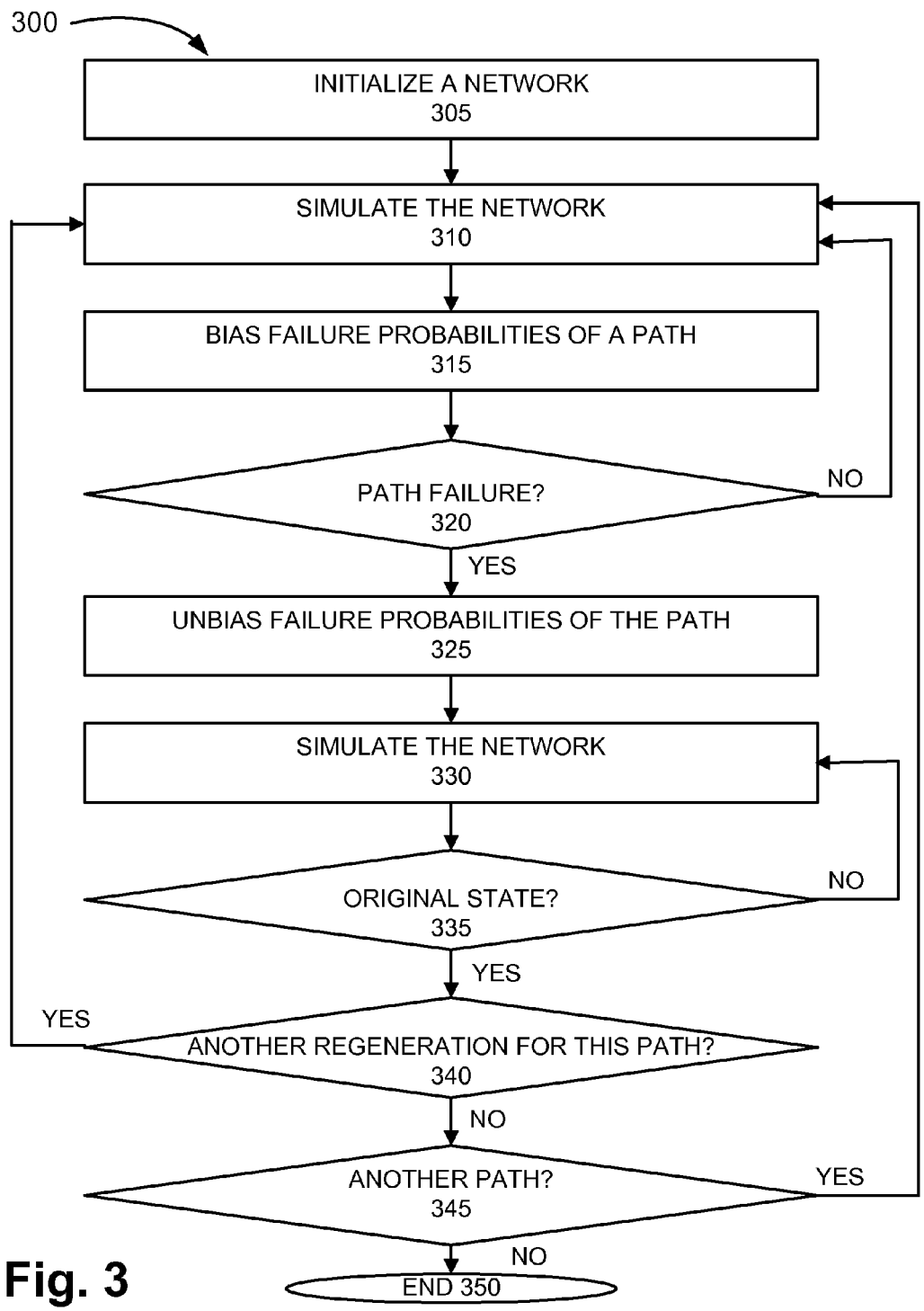
FIG. 3 is a flowchart of an exemplary process for simulating a network model according to an exemplary embodiment of a Stratified-Dynamic Path Failure Importance Sampling (DPFS) algorithm.

FIG. 3 is a flowchart of an exemplary process 300 for simulating a network model according to an exemplary embodiment of the Stratified-DPFS algorithm. Process 300 may be performed on user device 120. For example, processing system 205 may execute a Stratified-DPFS application 215 that includes the Stratified-DPFS algorithm described.

In block 305, user device 120 receives network information. For example, a user may input into user device 120 a network graph of a network (e.g., network 105) and initialization information (e.g., setting values to L, B_{link}(x), B_{circuit}(i), B_p(i), (C, P, bias β, target failure rate ratio α, I regenerations, Λ, n, R_g, repair rate μ_g, failure rate λ_g, etc.), as previously described. This information is stored in memory/storage 210 and accessible to the Stratified-DPFS application 215 during execution.

In block 310, user device 120 simulates the network. For example, the network (e.g., network 105) is simulated (e.g., executed) by the Stratified-DPFS application 215 based on the network graph and initialization information. According to an exemplary embodiment, a DTMC is executed during the simulation with deterministic state holding times.

In block 315, user device 120 biases failure probabilities and/or failure rates. For example, during the Stratified-DPFS simulation, the probability of transitioning from one state to another state is biased (e.g., increased or decreased), which may depend on the failure rates and/or repair rates. Additionally, during the Stratified-DPFS simulation, a particular number of regenerations I(p) is simulated until the failure of the path p is sampled or the regenerative state n=0 is reached. For example, as illustrated in block 320, during the Stratified-DPFS simulation, it is determined whether the path failed. If a path failure does not occur during the Stratified-DPFS simulation (block 320—NO), the simulation of the network and biasing of failure probabilities of the path continues (blocks 310 and 315). If a path failure does occur during the Stratified-DPFS simulation (block 320—YES), the failure probabilities are unbiased (i.e., turned off) for this path (block 325).

In block 330, user device 120 continues to simulate the network. For example the Stratified-DPFS simulation of the network continues with unbiased transition probabilities while the path is being repaired according to a repair rate. In block 335, it is determined whether the network has returned to its original state. If the network has not returned to its original state (block 335—NO), the Stratified-DPFS simulation of the network continues (block 330). If the network has returned to its original state (block 335—YES), it is determined whether another regeneration for this path p is to be conducted (e.g., based on the value of I(p)) (block 340). If so (block 340—YES), the Stratified-DPFS simulation continues to block 310. If not (block 340—NO), it is determined whether another path is to be simulated (block 345). For example, as previously described, during the Stratified-DPFS simulation, each path is sampled according to a particular number of regenerations I(p) so path failure samples may be obtained for all paths even when differences of unavailabilities among paths exist. If another path is to be simulated (block 345-YES), process 300 continues to block 310. Otherwise, the Stratified-DPFS simulation ends (block 350) and the estimates D'(i) and U'(i) can obtained using equations (1) and (2), respectively.

Although FIG. 3 illustrates an exemplary process 300 for simulating a network according to the Stratified-DPFS algorithm, according to other implementations, process 300 may include additional operations, fewer operations, and/or different operations than those illustrated in FIG. 3 and described herein.

According to Stratified-DPFS previously described, the number of regenerations I(p) assigned to the sampling of path p failures is a parameter. For example, I(1) can be set I(1)=I (2)= . . . =I(P). However, according to Adaptive Stratified-DPFS, the number of regenerations I(p) may be chosen to provide more regenerations to paths that have an intrinsically higher sample coefficient of variation of path unavailability relative to other paths. As a result, this may improve the estimates of path unavailability.

According to an exemplary embodiment of Adaptive Stratified-DPFS, the number of regenerations I(p) may be made proportional to the sample coefficient of variation of the downtime of path p in a regenerative cycle, as found with a set of T test regenerations. The test regenerations can be simulated using the Stratified-DPFS algorithm with I(p)=T/P, in which T is some multiple of P. Following the completion of the T test regenerations, the sample coefficient of variation χ'(i) of the downtime of a path i, 1≤i≤P, can be expressed according to the following expression:

$$\chi'(i) = \sqrt{\frac{\sum_{r=1}^{T} (D'(i, r) - D'(i))^2}{D'(i)^2(T-1)}}.$$

Following the completion of the T test regenerations, a simulation according to Stratified-DPFS may be used, in which I=I(1)+ ... +I(P) regenerations modifies the Stratified-DPFS based on the following expression:

$$I(p)=I\chi'(p)/\Sigma_{i=1}^{P}\chi'(i).$$

Following the completion of the I regenerations, the estimates D'(i) are computed using all of the T+I regenerations that have been simulated, according to the following expression:

$$D'(i)=\Sigma_{r=1}^{T+I}D'(i,r)/(T+I). \quad (3)$$

The estimates for U'(i) are then calculated according to equation (2) stated above.

Figure 4A:
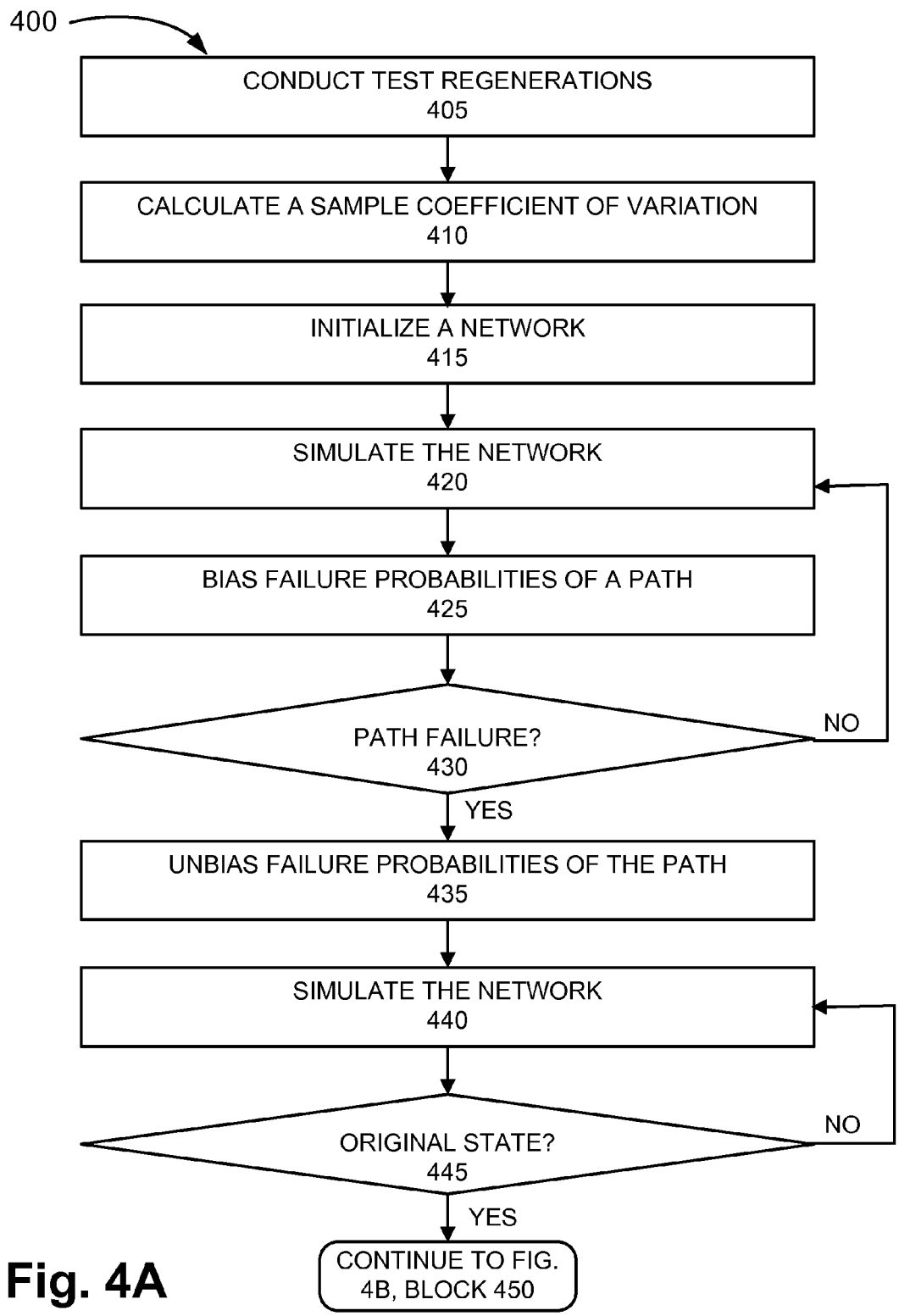
FIGS. 4A and 4B are flowcharts of an exemplary process for simulating a network model according to an exemplary embodiment of an Adaptive Stratified-DPFS algorithm.
Figure 4B:
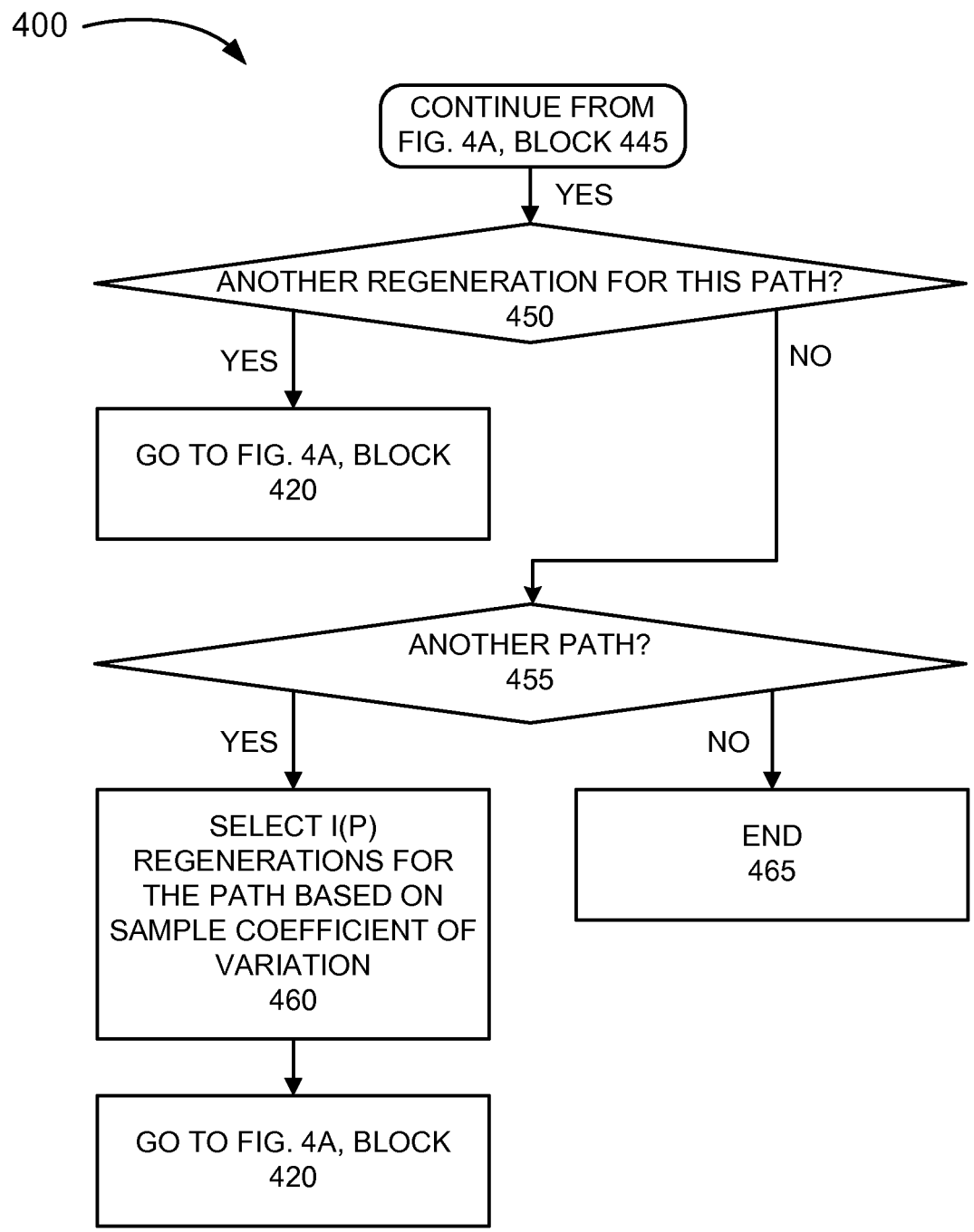

FIGS. 4A and 4B are flowcharts of an exemplary process 400 for simulating a network model according to an exemplary embodiment of the Adaptive Stratified-DPFS algorithm. Process 400 may be performed on user device 120. For example, processing system 205 may execute an Adaptive Stratified-DPFS application 215 that includes the Adaptive Stratified-DPFS algorithm described.

In block 405, user device 120 conducts with a set of T test regenerations. For example, as previously described, the test regenerations can be simulated using the Stratified-DPFS algorithm with I(p)=T/P, in which T is some multiple of P, and P is the number paths.

In block 410, user device 120 calculates the sample coefficient of variation $\chi'(i)$ of the downtime of each path i, as explained above, based on the previously conducted T test regenerations.

In block 415, user device 120 receives network information. For example, a user may input into user device 120 a network graph of a network (e.g., network 105) and initialization information (e.g., setting values to L, $B_{link}(x)$, $B_{circuit}$(i), $B_{path}$(i), C, P, bias β, target failure rate ratio α, I(p) regenerations for each path (calculated based on the sample coefficient of variation for each path i), Λ, n, m, G, $R_g$, repair rate $μ_g$, failure rate $λ_g$, etc.), as previously described. This information is stored in memory/storage 210 and accessible to the Adaptive Stratified-DPFS application 215 during execution.

In block 420, user device 120 simulates the network. For example, the network (e.g., network 105) is simulated (e.g., executed) by the Adaptive Stratified-DPFS application 215 based on the network graph and initialization information. According to an exemplary embodiment, a DTMC is executed during the simulation with deterministic state holding times.

In block 425, user device 120 biases failure probabilities and/or failure rates. For example, as previously described above, during the Adaptive Stratified-DPFS simulation, the probability of transitioning from one state to another state is biased (e.g., increased or decreased), which may depend on the failure rates and/or repair rates. Additionally, as previously described, during the Adaptive Stratified-DPFS simulation, a particular number of regenerations I(p), based on the calculated sample coefficient of variation, is simulated for a path p until the failure of the path is sampled or the regenerative state n=0 is reached. For example, as illustrated in block 430, during the Adaptive Stratified-DPFS simulation, it is determined whether the path failed. If a path failure does not occur during the Adaptive Stratified-DPFS simulation (block 430—NO), the simulation of the network and biasing of failure probabilities of the path continues (blocks 420 and 425). If a path failure does occur during the Adaptive Stratified-DPFS simulation (block 430—YES), the failure probabilities are unbiased (i.e., turned off) for this path (block 435).

In block 440, user device 120 continues to simulate the network. For example the Adaptive Stratified-DPFS simulation of the network continues with unbiased transition probabilities while the path is being repaired according to a repair rate. In block 445, it is determined whether the network has returned to its original state. If the network has not returned to its original state (block 445—NO), the Adaptive Stratified-DPFS simulation of the network continues (block 440). If the network has returned to its original state (block 445—YES), it is determined whether another regeneration for this path p is to be conducted (e.g., based on the value of I(p)) (block 450), as illustrated in FIG. 4B. If so (block 450—YES), the Adaptive Stratified-DPFS simulation continues to block 420. If not (block 450—NO), it is determined whether another path is to be simulated (block 455). For example, as previously described, during the Adaptive Stratified-DPFS simulation, each path is sampled according to a particular number of regenerations I(p), based on the calculated sample coefficient of variation, so path failure samples may be obtained for all paths even when differences of unavailabilities between paths exist. If another path is to be simulated (block 455—YES), the number of I(p) regeneration for the path is selected (block 460) and process 400 continues to block 420. Otherwise, the Adaptive Stratified-DPFS simulation ends (block 465), and the estimates D'(i) are computed according to equation (3) in which all of the T+I regenerations have been simulated and the estimates for U'(i) are also calculated according to equation (2).

Although FIGS. 4A and 4B illustrate an exemplary process 400 for simulating a network according to the Adaptive Stratified-DPFS algorithm, according to other implementations, process 400 may include additional operations, fewer operations, and/or different operations than those illustrated in FIGS. 4A and 4B, and described herein.

According to an exemplary embodiment, another variation of DPFS called Path-Group Failure Importance Sampling (PGFS) is described. PGFS is applicable to mesh networks with S groups of static, pre-provisioned protection paths and a static path routing matrix P. In PGFS, a path group s is defined to be operational if at least one path in the group of N(s) paths is operational. Otherwise, the path group is not operational (i.e., if all paths in a path group are not operational). The notation for the downtime measures D( ) and unavailability measures U( ) now refers to groups of paths (i.e., path groups), as opposed to individual paths. Also, U(s, k)=1 if path group s is not operational at time epoch k in the DTMC under $B_{circuit}(k)$ and P, and 0 otherwise. The importance sampling scheme in PGFS turns off the failure biasing in a regenerative cycle only when all the N(s) paths in any particular path group s have failed or when state n=0 is reached. This is in contrast to DPFS in which the bias is turned off when any particular path fails, and in turn, the failure of a particular group could remain a rare event and may likely not be sampled in a simulation. The group failure biasing in PGFS makes the sampling of path group failures much more likely. According to an exemplary embodiment, the PGFS algorithm may be performed according to the following pseudo code:

Set P.
Set the target failure rate ratio α.
Set the bias β.
For r = 1, ..., I
{
   Set the initial state to n = 0.
   Set m ≠ 0.
   Initialize circuits state $B_{circuit}(0)$.

```
For 1 ≤ g ≤ G: Set failure rate λ_g to β λ_g (i.e., turn bias on).
For 1 ≤ s ≤ S: Set D'(s,r) = 0 and U(s, 0) = 0.
Set k = 0 and Λ = 1.0.
While m ≠ 0
{
    For 1 ≤ s ≤ S: D'(s,r) = D'(s,r) + U(s, k)h(n).
    If U(s, k) = 1 for any s, 1 ≤ s ≤ S:
        Set failure rate of FEG g to λ_g (i.e., turn bias off)
            for 1 ≤ g ≤ G.
    Randomly sample the next state transition out of state n in the
    DTMC:
        New state is m.
    Set Λ = Λ p(n, m) / p*(n, m) and k = k+1.
    Update B_circuit (k).
    For 1 ≤ s ≤ S: Update U(s, k).
    Set n = m.
}
For 1 ≤ s ≤ S: D'(s,r) = D'(s,r) Λ.
}
```

Following the completion of the PGFS simulation, the mean estimate of D(s) can be expressed by:

$$D'(s) = \Sigma_{r=1}^{I} D'(s,r)/I. \quad (4)$$

The estimate of the unavailability of path group s can be expressed by:

$$U'(s) = D'(s)(\Sigma_{g=1}^{G} \xi_g \lambda_g) \Pi_{g=1}^{G} f_g(0). \quad (5)$$

Figure 5:
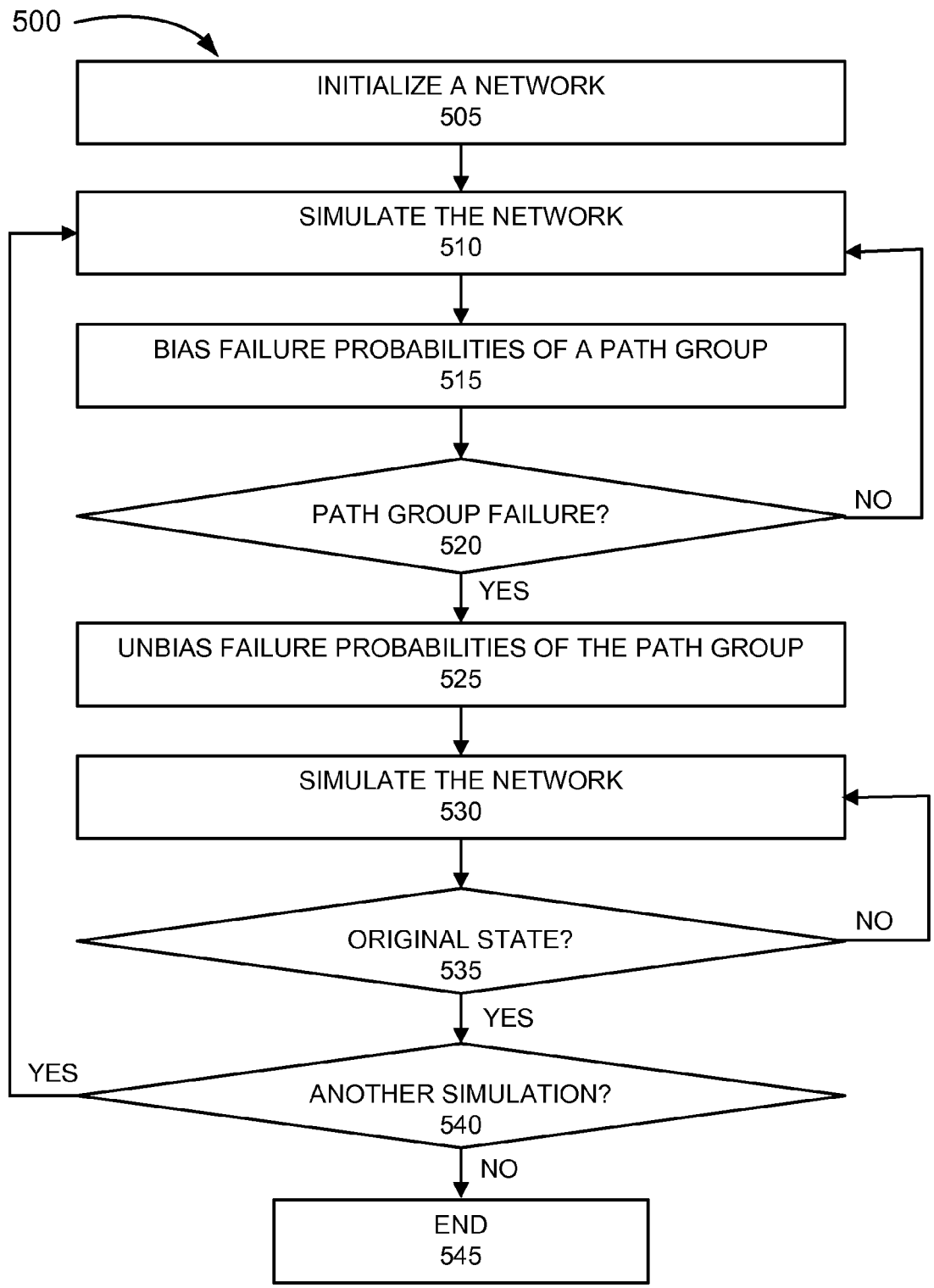
FIG. 5 is a flowchart of an exemplary process for simulating a network model according to an exemplary embodiment of a Path Group Failure Importance Sampling (PGFS) algorithm.

FIG. 5 is a flowchart of an exemplary process 500 for simulating a network model according to an exemplary embodiment of the PGFS algorithm. Process 500 may be performed on user device 120. For example, processing system 205 may execute a PGFS application 215 that includes the PGFS algorithm described.

In block 505, user device 120 receives network information. For example, a user may input into user device 120 a network graph of a network (e.g., network 105) and initialization information (e.g., setting values to L, $B_{link}(x)$, $B_{circuit}(i)$, $B_{path}(i)$, (C, P, bias β, target failure rate ratio α, Λ, n, $R_g$, repair rate $\mu_g$, failure rate $\lambda_g$, etc.), as previously described. Additionally, a user may input a value for S and define the path groups. A path group includes one or multiple paths. According to an exemplary implementation, the user may arbitrarily define path groups in the network. Alternatively, a path group may be defined based on a common source node, a common destination node, or a combination thereof. For example, a path group may be defined based on a particular destination from different sources, or a path group may be defined based on a particular source traversing different paths to a common destination. This information is stored in memory/storage 210 and accessible to the PGFS application 215 during execution.

In block 510, user device 120 simulates the network. For example, the network (e.g., network 105) is simulated (e.g., executed) by the PGFS application 215 based on the network graph and initialization information. According to an exemplary embodiment, a DTMC is executed during the simulation with deterministic state holding times.

In block 515, user device 120 biases failure probabilities and/or failure rates. For example, as previously described above, during the PGFS simulation, the probability of transitioning from one state to another state is biased (e.g., increased or decreased), which may depend on the failure rates and/or repair rates. As previously described, a path group failure occurs when all the paths in the path group fail. If a path group failure does not occur during the PGFS simulation (block 520—NO), the simulation of the network and biasing of failure probabilities continues (blocks 510 and 515). If a path failure does occur during the PGFS simulation (block 520—YES), the failure probabilities are unbiased (i.e., turned off) (block 525).

In block 530, user device 120 continues to simulate the network. For example the PGFS simulation of the network continues with unbiased transition probabilities while the path group is being repaired according to a repair rate. In block 535, it is determined whether the network has returned to its original state. If the network has not returned to its original state (block 535—NO), the PGFS simulation of the network continues (block 530). If the network has returned to its original state (block 535—YES), it is determined whether another simulation is to be conducted (block 540). For example, the user may enter the number of simulations to be run in block 505, or the user may be prompted. However, during a PGFS simulation it is probable that the failure of each path group s will not be realized. Rather, a path group having a higher susceptibility of unavailability relative to other path groups will likely fail first. This issue is addressed in Stratified-PFGS and Adaptive Stratified-PGFS, described below. Referring back to FIG. 5, if additional simulations are to be conducted (block 540—YES), the PGFS simulation continues to block 510. If no additional simulations are to be conducted (block 540—NO), process 500 ends (block 545) and the estimates D'(s) and U'(s) can obtained using equations (4) and (5), respectively.

Although FIG. 5 illustrates an exemplary process 500 for simulating a network according to the PGFS algorithm, according to other implementations, process 500 may include additional operations, fewer operations, and/or different operations than those illustrated in FIG. 5 and described herein.

A problem that can arise when applying PGFS to a mesh network with groups of static protection paths is that PGFS may not obtain any non-zero estimates D'(s,r) for a path group s. In such a case, it is not able to obtain an estimate for U'(s). This situation can arise if the unavailability of path groups is imbalanced or have orders of magnitude difference. Imbalances may arise from differences in the distances between node pairs, from groups having different numbers of static paths, and from combinations of these factors. In practice, some path groups may include only one unprotected path, while other path groups may include two, three, or more paths, depending on the quality of service availability being offered to a customer. In Stratified-PGFS, this potential problem may be minimized by turning the failure biasing off in PGFS only when the failure of a particular path group, as opposed to any group, has been sampled. This makes it much more likely path group failure samples for all path groups in the network may be obtained.

In Stratified-PGFS, I(z) regenerations are assigned for the sampling of path group z failures. The total number of simulated regenerations is I=I(1)+ . . . +I(S). Without loss of generality, I(1) may be set to I(1)=I(2)= . . . =I(S). According to an exemplary embodiment, a Stratified-PGFS simulation may include to simulate I(1) regenerations with the failure biasing turned on until the failure of path group 1 is sampled or the regenerative state n=0 is reached, simulate I(2) regenerations with the failure biasing turned on until the failure of path group 2 is sampled or the regenerative state n=0 is reached; and so on, until all I regenerations have been completed. According to an exemplary implementation, the Stratified-PGFS algorithm may be performed according to the following pseudo code:

```
Set P.
Set the target failure rate ratio α.
Set the bias β.
For 1 ≤ z ≤ S
{
   For x = 1, ..., I(z)
   {
      r = x + Σ_{i-1}^{z-1} I(i)
      Set the initial state to n = 0.
      Set m ≠ 0.
      Initialize circuits state B_{circuit} (0).
      For 1 ≤ g ≤ G: Set failure rate λ_g to β λ_g (i.e., turn the bias on).
      For 1 ≤ s ≤ S: Set D'(s,r) = 0 and U(s, 0) = 0.
      Set k = 0 and Λ = 1.0.
      While m ≠ 0
      {
         For 1 ≤ s ≤ P: D'(s,r) = D'(s,r) + U(s, k)h(n).
         If U(z, k) = 1:
            Set failure rate of FEG g to λ_g (i.e., turn the bias off)
            for 1 ≤ g ≤ G
         Randomly sample the next state transition out of state n in the
         DTMC:
            New state is m.
         Set Λ = Λ p(n, m) / p*(n, m) and k = k+1.
         Update B_{circuit} (k).
         For 1 ≤ s≤ S: Update U(s, k).
         Set n = m.
      }
      For 1 ≤ s ≤ S: D'(s,r) = D'(s,r) Λ.
   }
}
```

Following the completion of the above simulation, the estimates D'(s) and U'(s) are obtained using equations (4) and (5), respectively.

Figure 6:
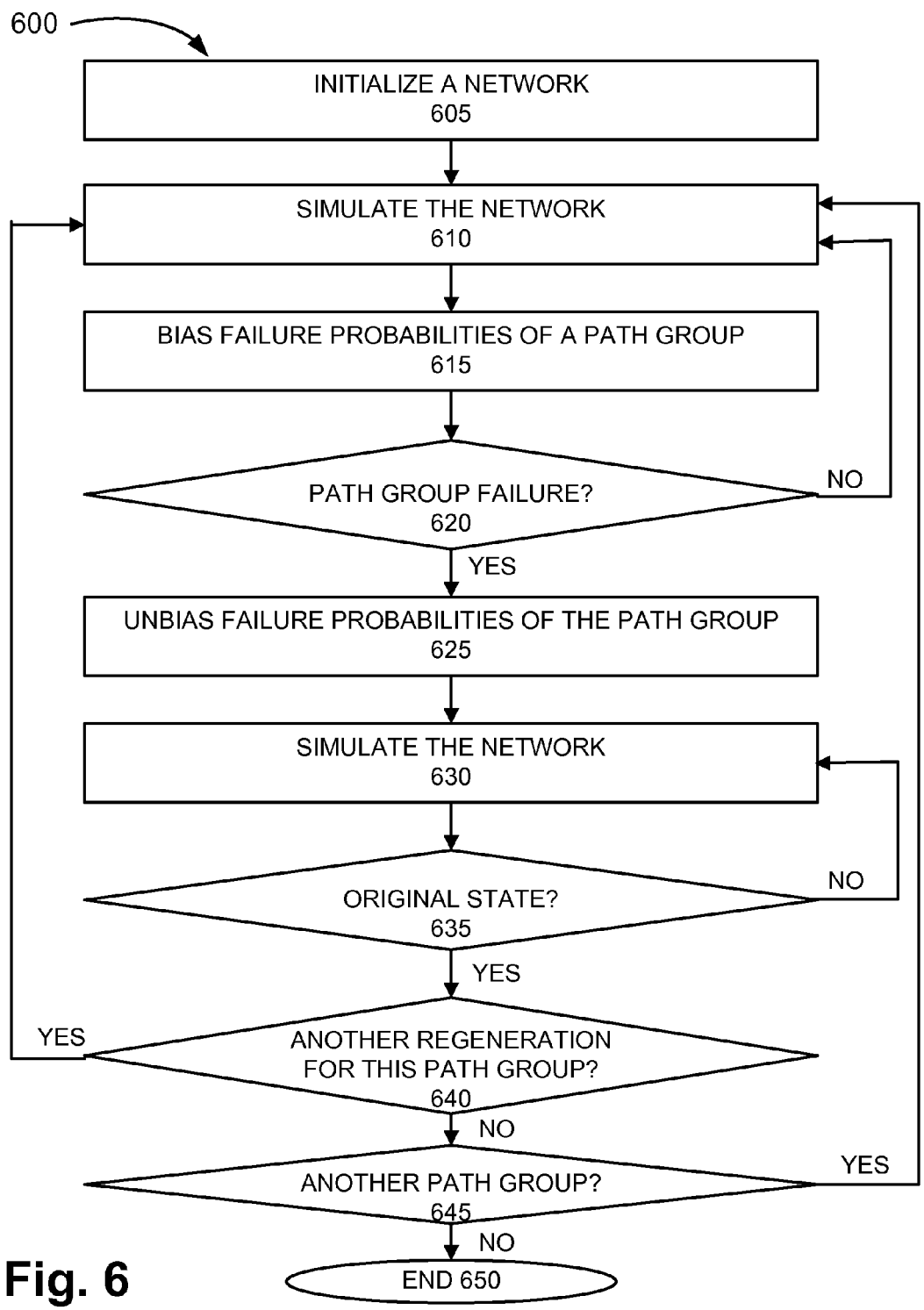
FIG. 6 is a flowchart of an exemplary process for simulating a network model according to an exemplary embodiment of the Stratified-PGFS algorithm.

FIG. 6 is a flowchart of an exemplary process 600 for simulating a network model according to an exemplary embodiment of the Stratified-PGFS algorithm. Process 600 may be performed on user device 120. For example, processing system 205 may execute a Stratified-PGFS application 215 corresponding to the Stratified-PGFS algorithm described.

In block 605, user device 120 receives network information. For example, a user may input into user device 120 a network graph of a network (e.g., network 105) and initialization information (e.g., setting values to L, $B_{link}(x)$, $B_{circuit}$(i), $B_{path}(i)$, (C, P, bias β, target failure rate ratio α, I regenerations, Λ, n, $R_g$, repair rate $\mu_g$, failure $\lambda_g$, etc.), as previously described. Additionally, a user may input a value for S and define the path groups. A path group includes one or multiple paths. According to an exemplary implementation, the user may arbitrarily define path groups in the network. Alternatively, a path group may be defined based on a common source node, a common destination node, or a combination thereof. For example, a path group may be defined based on a particular destination from different sources, or a path group may be defined based on a particular source traversing different paths to a common destination. This information is stored in memory/storage 210 and accessible to the Stratified-PGFS application 215 during execution.

In block 610, user device 120 simulates the network. For example, the network (e.g., network 105) is simulated (e.g., executed) by the PGFS application 215 based on the network graph and initialization information. According to an exemplary embodiment, a DTMC is executed during the simulation with deterministic state holding times.

In block 615, user device 120 biases failure probabilities and/or failure rates. For example, as previously described above, during the Stratified-PGFS simulation, the probability of transitioning from one state to another state is biased (e.g., increased or decreased), which may depend on the failure rates and/or repair rates. Additionally, as previously described, during the Stratified-PGFS simulation, a particular number of regenerations I(z) is simulated for a path group s until the failure of the path group s is sampled or the regenerative state n=0 is reached. For example, as illustrated in block 620, during the Stratified-PGFS simulation, it is determined whether the path group failed. If a path group failure does not occur during the Stratified-PGFS simulation (block 620—NO), the simulation of the network and biasing of failure probabilities of the path group continues (blocks 610 and 615). If a path group failure does occur during the Stratified-PGFS simulation (block 620—YES), the failure probabilities are unbiased (i.e., turned off) for this path group (block 625).

In block 630, user device 120 continues to simulate the network. For example the Stratified-PGFS simulation of the network continues with unbiased transition probabilities while the path group is being repaired according to a repair rate. In block 635, it is determined whether the network has returned to its original state. If the network has not returned to its original state (block 635—NO), the Stratified-PGFS simulation of the network continues (block 630). If the network has returned to its original state (block 635—YES), it is determined whether another regeneration for this path group s is to be conducted (e.g., based on the value of I(z)) (block 640). If so (block 640—YES), the Stratified-PGFS simulation continues to block 610. If not (block 640—NO), it is determined whether another path group is to be simulated (block 645). For example, as previously described, during the Stratified-PGFS simulation, each path group is sampled according to a particular number of regenerations I(z) so path group failure samples may be obtained for all path groups even when differences of unavailabilities between path groups exist. If another path group is to be simulated (block 645—YES), process 600 continues to block 610. Otherwise, the Stratified-PGFS simulation ends (block 650) and the estimates D'(s) and U'(s) can obtained using equations (4) and (5), respectively.

Although FIG. 6 illustrates an exemplary process 600 for simulating a network according to the Stratified-PGFS algorithm, according to other implementations, process 600 may include additional operations, fewer operations, and/or different operations than those illustrated in FIG. 6 and described herein.

According to Stratified-PGFS previously described, the number of regenerations I(z) assigned to the sampling of path group z failures is a parameter and the number of regenerations is the same for each path group. However, according to Adaptive Stratified-PGFS, the number of regenerations I(z) may be chosen to provide more regenerations to path groups that have an intrinsically higher sample coefficient of variation of path group unavailability relative to other path groups. As a result, this may improve the estimates of path group unavailability.

According to an exemplary embodiment of Adaptive Stratified-PGFS, the number of regenerations may be made proportional to the sample coefficient of variation of the downtime of path group s in a regenerative cycle, as found with a set of T test regenerations. The test regenerations can be simulated using the Stratified-PGFS algorithm with I(s) =T/S, in which T is some multiple of S, and S is the number of path groups. Following the completion of the T test regenerations, the sample coefficient of variation χ'(s) of the downtime of path group s, can be expressed according to the following:

$$\chi'(s) = \sqrt{\frac{\sum_{r=1}^{T}(D'(s,r) - D'(s))^2}{D'(s)^2(T-1)}}.$$

Following the completion of the T test regenerations, a simulation according to the Stratified-PGFS scheme may be used, in which I=I(1)+ . . . +I(S) regenerations modifies the Stratified-PGFS based on the following expression:

$$I(z) = \frac{I\chi'(z)}{\sum_{s=1}^{S}\chi'(s)}.$$

Following the completion of the I regenerations, the estimates D'(s) are computed using all of the T+I regenerations that have been simulated, according to the following expression:

$$D'(s) = \Sigma_{r=1}^{T+I} D'(s,r)/(T+I). \quad (6)$$

The estimates for U'(i) are then calculated according to equation (5) stated above.

Figure 7A:
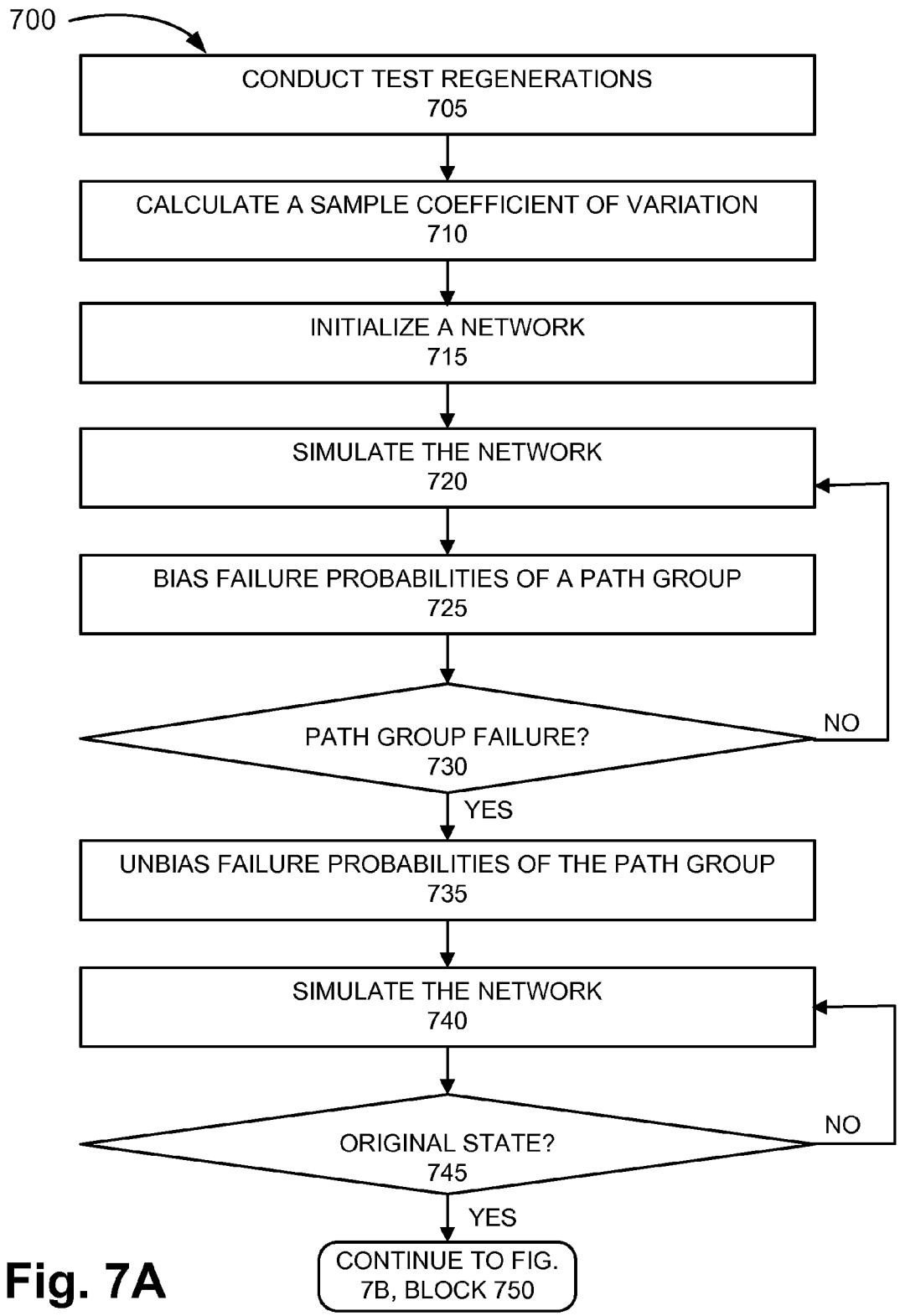
FIGS. 7A and 7B are flowcharts of an exemplary process for simulating a network model according to an exemplary embodiment of the Adaptive Stratified-PGFS algorithm.
Figure 7B:
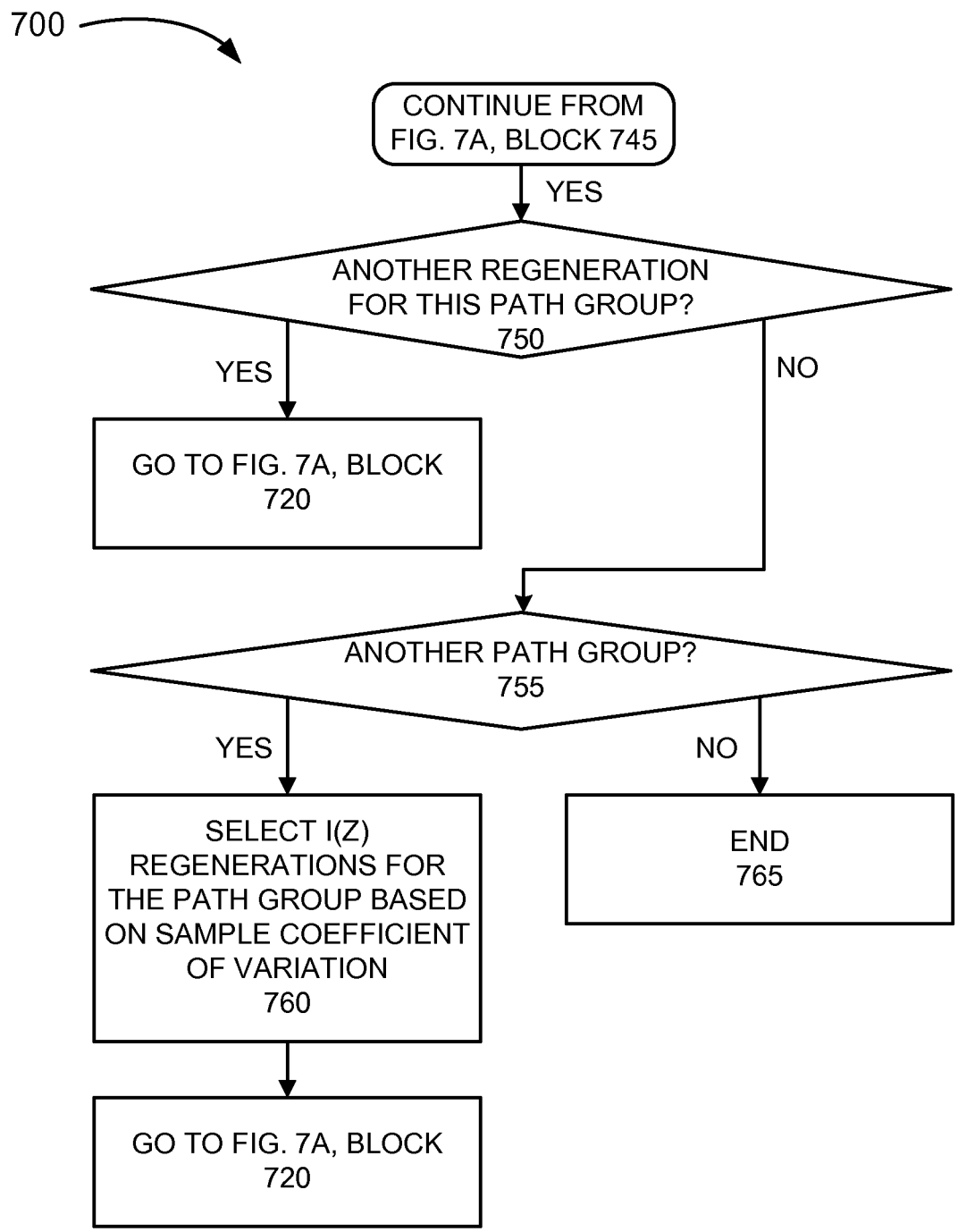

FIGS. 7A and 7B are flowcharts of an exemplary process 700 for simulating a network model according to an exemplary embodiment of the Adaptive Stratified-PGFS algorithm. Process 700 may be performed on user device 120. For example, processing system 205 may execute an Adaptive Stratified-PGFS application 215 corresponding to the Adaptive Stratified-PGFS algorithm described.

In block 705, user device 120 conducts a set of T test regenerations. For example, as previously described, the test regenerations can be simulated using the Stratified-PGFS algorithm with I(s)=T/S, in which T is some multiple of S, and S is the number of path groups.

In block 710, user device 120 calculates the sample coefficient of variation $\chi'(z)$ of the downtime of each path group z, as explained above, based on the previously conducted T test regenerations.

In block 715, user device 120 receives network information. For example, a user may input into user device 120 a network graph of a network (e.g., network 105) and initialization information (e.g., setting values to L, $B_{link}(x)$, $B_{circuit}(i)$, $B_{path}$ C, P, bias β, target failure rate ratio α, I(z) regenerations for each path group z (based on the sample coefficient of variation), Λ, n, m, G, $R_g$, repair rate $\mu_g$, failure rate $\lambda_g$ etc.), as previously described. Additionally, a user may input a value for S and define the path groups. A path group includes one or multiple paths. According to an exemplary implementation, the user may arbitrarily define path groups in the network. Alternatively, a path group may be defined based on a common source node, a common destination node, or a combination thereof. For example, a path group may be defined based on a particular destination from different sources, or a path group may be defined based on a particular source traversing different paths to a common destination. This information is stored in memory/storage 210 and accessible to the Adaptive Stratified-PGFS application 215 during execution.

In block 720, user device 120 simulates the network. For example, the network (e.g., network 105) is simulated (e.g., executed) by the Adaptive Stratified-PGFS application 215 based on the network graph and initialization information.

According to an exemplary embodiment, a DTMC is executed during the simulation with deterministic state holding times.

In block 725, user device 120 biases failure probabilities and/or failure rates. For example, as previously described above, during the Adaptive Stratified-PGFS simulation, the probability of transitioning from one state to another state is biased (e.g., increased or decreased), which may depend on the failure rates and/or repair rates. Additionally, as previously described, during the Adaptive Stratified-PGFS simulation, a particular number of regenerations I(z), based on the calculated sample coefficient of variation, is simulated for a path group s until the failure of the path group s is sampled or the regenerative state n=0 is reached. For example, as illustrated in block 730, during the Adaptive Stratified-PGFS simulation, it is determined whether the path group failed. If a path group failure does not occur during the Adaptive Stratified-PGFS simulation (block 730—NO), the simulation of the network and biasing of failure probabilities of the path group continues (blocks 720 and 725). If a path group failure does occur during the Adaptive Stratified-PGFS simulation (block 730—YES), the failure probabilities are unbiased (i.e., turned off) for this path group (block 735).

In block 740, user device 120 continues to simulate the network. For example the Adaptive Stratified-PGFS simulation of the network continues with unbiased transition probabilities while the path group is being repaired according to a repair rate. In block 745, it is determined whether the network has returned to its original state. If the network has not returned to its original state (block 745—NO), the Adaptive Stratified-PGFS simulation of the network continues (block 740). If the network has returned to its original state (block 745—YES), it is determined whether another regeneration for this path group s is to be conducted (e.g., based on the value of I(z)) (block 750), as illustrated in FIG. 7B. If so (block 750—YES), the Adaptive Stratified-PGFS simulation continues to block 720. If not (block 750—NO), it is determined whether another path group is to be simulated (block 755). For example, as previously described, during the Adaptive Stratified-PGFS simulation, each path group is sampled according to a particular number of regenerations I(z), based on the calculated sample coefficient of variation, so path group failure samples may be obtained for all path groups even when differences of unavailabilities between path groups exist. If another path group is to be simulated (block 755—YES), the number of I(z) regeneration for the path group is selected (block 760) and process 700 continues to block 720. Otherwise, the Adaptive Stratified-PGFS simulation ends (block 765), and the estimates D'(s) and estimates U'(s) are also calculated according to equations (6) and (5), respectively.

Although FIGS. 7A and 7B illustrate an exemplary process 700 for simulating a network according to the Adaptive Stratified-PGFS algorithm, according to other implementations, process 700 may include additional operations, fewer operations, and/or different operations than those illustrated in FIGS. 7A and 7B, and described herein.

The foregoing description of implementations provides illustration, but is not intended to be exhaustive or to limit the implementations to the precise form disclosed. Accordingly, modifications to the implementations described herein may be possible.

The algorithms described herein may be extended to the case of a mesh network that uses both dynamic path restoration and groups of static protection paths for the end-to-end protection of services. In such a mixed case, some end-to-end services may be protected by dynamic path restoration, some services may be protected using groups of static protection paths, and some services may not have any protection. The mixed case may arise in practice when different levels of service protection are to be provided to customers that have different service availability requirements and/or service level agreements. For the availability analysis of such a mixed network, Stratified-DPFS or Adaptive Stratified-DPFS may be applied to the services that are protected by dynamic path restoration and Stratified-PGFS or Adaptive Stratified-PGFS may be applied to the services that are protected by groups of static protection paths.

Other modifications may be applied to the algorithms described herein. For example, the rate of failure and/or the rate of repair may apply to circuits or some other type of network element. Also, embodiments described herein use failure rate $\lambda_g$ and repair rate $\mu_g$, but other types of transition rates (i.e., a rate to which a network element (e.g., a link, a node, etc.) and/or a model state (e.g., a Markov model state, etc.) transitions to a different state or condition), probabilities, etc. may be applied.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 3-7B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
 receiving a network model including network elements, wherein a network element is one of a node, a link, a circuit, or a path, wherein at least one of the paths of the network elements has dynamic path restoration capability;
 receiving network simulation information that includes failure equivalence groups, a failure rate that indicates a rate of failure pertaining to each failure equivalence group, a repair rate that indicates a rate of repair pertaining to each failure equivalence group, a number of repair personnel assigned to each failure equivalence group, and a regeneration value indicating a number of regenerations to occur for each designated path during a network simulation, wherein a failure equivalence group includes one or more links belonging to one or more designated paths in the network model;
 executing the network simulation of the network model, wherein the executing comprises:
  biasing at least one of the failure rate or the repair rate for the failure equivalence groups;
  determining whether one of the one or more designated paths enters a failure state given a current biasing;
  unbiasing the at least one of the failure rate or the repair rate when it is determined that the one of the one or more designated paths enters the failure state;
  identifying when the failure equivalence groups return to an operative state;
  determining whether a regeneration of the one of the one or more designated paths is to be re-simulated based on the regeneration value associated with the one of the one or more designated paths;
  determining whether another one of the one or more designated paths is to be simulated when it is determined that the regeneration of the one of the one or more designated paths is not to be re-simulated; and
  ceasing an execution of the network simulation when it is determined that another one of the one or more designated paths does not exist; and
 calculating an average time of path unavailability for each designated path simulated based on the network simulation; and
 calculating path unavailability for each designated path simulated based on the network simulation.

2. The method of claim 1, further comprising:
 receiving a designation of paths for which the average time of path unavailability and path unavailability are to be calculated.

3. The method of claim 1, further comprising:
 executing a test network simulation previous to the network simulation;
 calculating a tested average time of path unavailability for each designated path;
 calculating a sample coefficient of variation for each designated path based on the calculated tested average time of path unavailability; and
 calculating the regeneration value for each designated path based on the sample coefficient of variation associated with each designated path.

4. The method of claim 3, wherein the regeneration value is different between the one of the one or more designated paths and the other one of the one or more designated paths.

5. The method of claim 3, wherein the regeneration value is the same between the one of the one or more designated paths and the other one of the one or more designated paths.

6. The method of claim 5, wherein the regeneration value is the same for each designated path and the network model is of a mesh network, and the method further comprising:
 re-executing the network simulation when it is determined that either the regeneration of the one of the one or more designated paths is to be re-simulated or another one of the one or more designated paths is to be simulated.

7. A method comprising:
receiving a network model including network elements, wherein a network element is one of a node, a link, a circuit, a path, and a path group that includes multiple paths, wherein one or more of the paths do not have path restoration capability;
receiving network simulation information that includes failure equivalence groups, a failure rate that indicates a rate of failure pertaining to each failure equivalence group, a repair rate that indicates a rate of repair pertaining to each failure equivalence group, a number of repair personnel assigned to each failure equivalence group, and a regeneration value indicating a number of regenerations to occur for each designated path group during a network simulation, wherein a failure equivalence group includes one or more links belonging to one or more designated path groups in the network model;
executing the network simulation of the network model, wherein the executing comprises:
biasing at least one of the failure rate or the repair rate for the failure equivalence groups;
determining whether one of the one or more designated path groups enter a failure state given a current biasing, wherein for each designated path group, the failure state occurs when all paths in the designated path group fail;
unbiasing the at least one of the failure rate or the repair rate when it is determined that the one of the one or more designated path groups enters the failure state;
identifying when the failure equivalence groups return to an operative state;
determining whether a regeneration of the one of the one or more designated path groups is to be re-simulated based on the regeneration value associated with the one of the one or more designated path groups;
determining whether another one of the one or more designated path groups is to be simulated when it is determined that the regeneration of the one of the one or more designated path groups is not to be re-simulated; and
ceasing an execution of the network simulation when it is determined that another one of the one or more designated path groups does not exist; and
calculating an average time of path group unavailability for each designated path group simulated based on the network simulation; and
calculating path group unavailability for each designated path group simulated based on the network simulation.

8. The method of claim 7, further comprising:
receiving a designation of path groups for which the average time of path unavailability and path unavailability are to be calculated.

9. The method of claim 7, further comprising:
executing a test network simulation previous to the network simulation;
calculating a tested average time of path unavailability for each designated path group;
calculating a sample coefficient of variation for each designated path group based on the calculated tested average time of path unavailability; and
calculating the regeneration value for each designated path group based on the sample coefficient of variation associated with each designated path group.

10. The method of claim 9, wherein the regeneration value is different between the one of the one or more designated path groups and the other one of the one or more designated path groups.

11. The method of claim 9, wherein the regeneration value is the same between the one of the one or more designated path group and the other one of the one or more designated path groups.

12. The method of claim 11, wherein the regeneration value is the same for each designated path group and the network model is of a mesh network, and the method further comprising:
re-executing the network simulation when it is determined that either the regeneration of the one of the one or more designated path groups is to be re-simulated or another one of the one or more designated path groups is to be simulated.

13. A non-transitory computer-readable medium comprising instructions executable by a processor of a computational device to:
receive a network model including network elements, wherein a network element is one of a node, a link, a circuit, or a path, wherein at least one of the paths of the network elements has dynamic path restoration capability;
receive network simulation information that includes failure equivalence groups, a failure rate that indicates a rate of failure pertaining to each failure equivalence group, a repair rate that indicates a rate of repair pertaining to each failure equivalence group, a number of repair personnel assigned to each failure equivalence group and a regeneration value indicating a number of regenerations to occur for each designated path during a network simulation, wherein a failure equivalence group includes one or more links belonging to one or more designated paths in the network model;
execute the network simulation of the network model, wherein the instructions to execute comprise instructions to:
bias at least one of the failure rate or the repair rate for the failure equivalence groups;
determine whether one of the one or more designated paths enters a failure state given a current biasing;
unbias the at least one of the failure rate or the repair rate when it is determined that the one of the one or more designated paths enters the failure state;
identify when the failure equivalence groups return to an operative state;
determine whether a regeneration of the one of the one or more designated paths is to be re-simulated based on the regeneration value associated with the one of the one or more designated paths;
determine whether another one of the one or more designated paths is to be simulated when it is determined that the regeneration of the one of the one or more designated paths is not to be re-simulated; and
cease an execution of the network simulation when it is determined that another one of the one or more designated paths does not exist; and
calculate an average time of path unavailability for each designated path simulated based on the network simulation; and
calculate path unavailability for each designated path simulated based on the network simulation.

14. The non-transitory computer-readable medium of claim 13, further comprising instructions executable by the processor of the computational device to:

execute a test network simulation previous to the network simulation;

calculate a tested average time of path unavailability for each designated path;

calculate a sample coefficient of variation for each designated path based on the calculated tested average time of path unavailability; and calculate the regeneration value for each designated path based on the sample coefficient of variation associated with each designated path.

15. The non-transitory computer-readable medium of claim 13, wherein the regeneration value is different between the one of the one or more designated paths and the other one of the one or more designated paths.

16. The non-transitory computer-readable medium of claim 13, wherein the regeneration value is the same for each designated path and the network model is of a mesh network.

17. The non-transitory computer-readable medium of claim 13, further comprising instructions executable by the processor of the computational device to:

re-execute the network simulation when it is determined that either the regeneration of the one of the one or more designated paths is to be re-simulated or another one of the one or more designated paths is to be simulated.

18. A non-transitory computer-readable medium comprising instructions executable by a processor of a computational device to:

receive a network model including network elements, wherein a network element is one of a node, a link, a circuit, a path, and a path group that includes multiple paths, wherein one or more of the paths do not have path restoration capability;

receive network simulation information that includes failure equivalence groups, a failure rate that indicates a rate of failure pertaining to each failure equivalence group, and a repair rate that indicates a rate of repair pertaining to each failure equivalence group, a number of repair personnel assigned to each failure equivalence group, and a regeneration value indicating a number of regenerations to occur for each designated path group during a network simulation, wherein a failure equivalence group includes one or more links belonging to one or more designated path groups in the network model;

execute the network simulation of the network model, wherein the instructions to execute comprise instructions to:

bias at least one of the failure rate or the repair rate for the failure equivalence groups;

determine whether one of the one or more designated path groups enter a failure state given a current biasing, wherein for each designated path group, the failure state occurs when all paths in the designated path group fail;

unbias the at least one of the failure rate or the repair rate when it is determined that the one of the one or more designated path groups enters the failure state;

identify when the failure equivalence groups return to an operative state;

determine whether a regeneration of the one of the one or more designated path groups is to be re-simulated based on the regeneration value associated with the one of the one or more designated path groups;

determine whether another one of the one or more designated path groups is to be simulated when it is determined that the regeneration of the one of the one or more designated path groups is not to be re-simulated; and cease an execution of the network simulation when it is determined that another one of the one or more designated path groups does not exist; and calculate an average time of path group unavailability for each designated path group simulated based on the network simulation; and calculate path group unavailability for each designated path group simulated based on the network simulation.

19. The non-transitory computer-readable medium of claim 18, comprising further instructions executable by the processor of the computational device to:

receive a designation of path groups for which the average time of path unavailability and path unavailability are to be calculated.

20. The non-transitory medium of claim 18, comprising further instructions executable by the processor of the computational device to:

execute a test network simulation previous to the network simulation;

calculate a tested average time of path unavailability for each designated path group;

calculate a sample coefficient of variation for each designated path group based on the calculated tested average time of path unavailability; and calculate the regeneration value for each designated path group based on the sample coefficient of variation associated with each designated path group.

21. The non-transitory computer-readable medium of claim 18, wherein the regeneration value is different between the one of the one or more designated path groups and the other one of the one or more designated path groups.

22. The non-transitory computer-readable medium of claim 18, wherein the regeneration value is the same between the one of the one or more designated path group and the other one of the one or more designated path groups.

23. The non-transitory computer-readable medium of claim 18, wherein the regeneration value is the same for each designated path group and the network model is of a mesh network.

24. The non-transitory computer-readable medium of claim 18, comprising further instructions executable by the processor of the computational device to:

re-execute the network simulation when it is determined that either the regeneration of the one of the one or more designated path groups is to be re-simulated or another one of the one or more designated path groups is to be simulated.

* * * * *